United States Patent
Ariyama

(10) Patent No.: US 6,625,284 B1
(45) Date of Patent: Sep. 23, 2003

(54) COMFORT NOISE GENERATING APPARATUS

(75) Inventor: Yoshihiro Ariyama, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 0 days.

(21) Appl. No.: 09/271,357

(22) Filed: Mar. 17, 1999

(30) Foreign Application Priority Data

Jul. 2, 1998 (JP) .......................................... 10-187698

(51) Int. Cl.$^7$ .............................. H04B 3/20; H04M 9/08
(52) U.S. Cl. ..................... 381/66; 704/228; 379/406.03
(58) Field of Search ................................ 704/226, 228, 704/227; 381/56, 61, 66, 94.4, 94.7; 370/289, 286; 379/406.01, 406.02, 406.03, 406.04, 406.15, 406.16

(56) References Cited

U.S. PATENT DOCUMENTS

| 5,485,522 A | * | 1/1996 | Solve et al. ................ 704/226 |
| 5,537,509 A | * | 7/1996 | Swaminathan et al. ..... 704/228 |
| 5,630,016 A | * | 5/1997 | Swaminathan et al. ..... 704/228 |
| 5,819,218 A | * | 10/1998 | Hayata et al. ............... 704/233 |
| 5,949,888 A | * | 9/1999 | Gupta et al. .................... 381/66 |
| 6,163,608 A | * | 12/2000 | Romesburg et al. ... 379/406.04 |
| 6,502,071 B1 | * | 12/2002 | Nagasaki .................... 704/226 |
| 2003/0063578 A1 | * | 4/2003 | Weaver ....................... 370/289 |

FOREIGN PATENT DOCUMENTS

JP 07248793 A * 9/1995 ............. G10L/7/02

OTHER PUBLICATIONS

General Characteristics of International Telephone Connections and International Telephone Circuits; Echo Cancellers, ITU–T Recommendation G. 165, International Telecommunication Union, 3–93.

* cited by examiner

Primary Examiner—Xu Mei
(74) Attorney, Agent, or Firm—Venable; Norman N. Kunitz

(57) ABSTRACT

A comfort noise generating apparatus designed to reduce a feeling of fracture in a voice sound and a feeling of unsuitableness at timings before and after a process by an NLP or the like. A comfort noise according to a voice signal after an unnecessary component has been removed is formed and added to this voice signal. The apparatus comprises: a noise generator for generating a noise which is multiplexed to a voice signal after completion of a process by an NLP; a signal level analyzing part for measuring a signal power of a voice signal before the process; a multiplier for varying noise characteristics from the noise generator in accordance with an analysis result of the signal level analyzing part; a signal frequency characteristics analyzing part for selecting the optimum coefficient from a coefficient register; a band pass filter for forming a comfort noise by the selected coefficient and a white noise signal; and an adder for multiplexing the comfort noise to the voice signal.

18 Claims, 6 Drawing Sheets

COMFORT NOISE GENERATING APPARATUS

BACKGROUND OF THE INVENTION

1. Field of the Invention

The invention relates to a comfort noise generating apparatus for generating a comfort noise corresponding to an output signal of an echo canceller or the like, and adding it to the output signal.

2. Description of Related Art

Generally, an echo canceler is used to cancel an acoustic echo in a hands-free cellular phone used in a vehicle, a television conference, or the like or to cancel a hybrid echo of an international telephone line. The echo canceler has a low level signal shut-off function called an NLP (non-linear process). However, when erasing an acoustic echo or the like by this function, there is a case that a feeling of fracture is generated in association with the voice sound at timings before and after the erasure. To alleviate the feeling of fracture associated to the voice sound, there is a function to add a synthetic noise called a comfort noise. As a comfort noise, it is a general way to add a white noise. That is, a white noise having a flat characteristic in a telephone voice sound band width (300 Hz to 3.4 kHz) is used.

The NLP and comfort noise which are used in the echo canceler are shown in detail in the ITU (International Telecommunication Union) Recommendation (TG.165).

Actually, the noises included in the background of the voice sound, however, do not always have uniform frequency characteristics and their characteristics largely differ in dependence on a use environment. There occurs a case, consequently, where the characteristics of the frequency component of the synthetic noise which is added as a comfort noise are largely different from those of the frequency component of the noises included in the actual voice sound. In this case, there arises a problem that a difference of a tone occurs between the comfort noise which is inserted at the time of the NLP operation and the background noises before and after the comfort noise and this difference causes a feeling of unsuitableness.

OBJECT AND SUMMARY OF THE INVENTION

To solve the above problems, it is an object of the invention to provide a comfort noise generating apparatus which generates a comfort noise in consideration of characteristics of a noise component in an actual voice sound and which can reduce a feeling of unfitness of the voice sound at the time of an NLP operation.

To accomplish the above object, according to the first aspect of the invention, there is provided a comfort noise generating apparatus for generating a comfort noise according to a voice signal from which an unnecessary component has been removed and for adding the comfort noise to the voice signal, comprising: noise generating means for generating a noise to be multiplexed to the voice signal after the unnecessary component has been removed; signal level analyzing means for measuring a signal power of the voice signal before the unnecessary component is removed; varying means for varying characteristics of the noise which is generated by the noise generating means in accordance with an analysis result by the signal level analyzing means and for forming a comfort noise; and synthesizing means for multiplexing the comfort noise formed by the varying means to the voice signal after the removal of the unnecessary component.

With the above construction, the unnecessary component is removed from the voice signal supplied to an apparatus such as echo canceler, noise canceler, or the like and the resultant voice signal is generated. In this instance, the comfort noise generating apparatus generates and adds the comfort noise to the output signal. In this case, the noise generating means always generates the noise at a predetermined level. The signal level analyzing means measures the signal power of the voice signal before the removal of the unnecessary component. In accordance with a result of the measurement, the varying means varies the characteristics of the noise which is generated by the noise generating means and forms the comfort noise. The comfort noise formed by the varying means is multiplexed to the voice signal after the removal of the unnecessary component by the synthesizing means, so that the voice signal including a natural noise is formed.

According to the second aspect of the invention, there is provided a comfort noise generating apparatus for generating a comfort noise according to a voice signal from which an unnecessary component has been removed and for adding the comfort noise to the voice signal, comprising: noise generating means for generating a noise to be multiplexed to the voice signal after the unnecessary component has been removed; background situation analyzing means for analyzing characteristics of the voice signal before the unnecessary component is removed or a background noise; varying means for varying characteristics of the noise which is generated by the noise generating means in accordance with an analysis result by the background situation analyzing means and for forming a comfort noise; and synthesizing means for multiplexing the comfort noise formed by the varying means to the voice signal after the removal of the unnecessary component.

With the above construction, the apparatus operates as a whole in a manner almost similar to the first invention. According to the invention, the characteristics of the noise are varied by the varying means on the basis of the characteristics of the voice signal or the background noise in place of the signal level of the voice signal. That is, the characteristics of the voice signal before the removal of the unnecessary component or the background noise is analyzed by the background situation analyzing means. In accordance with the analysis result, the characteristics of the noise which is generated by the noise generating means by the varying means are varied, thereby forming the comfort noise.

According to the third aspect of the invention, there is provided a comfort noise generating apparatus for generating a comfort noise according to a voice signal from which an unnecessary component has been removed and for adding the comfort noise to the voice signal, comprising: noise generating means for generating a noise to be multiplexed to the voice signal after the unnecessary component has been removed; signal level analyzing means for measuring a signal power of the voice signal before the unnecessary component is removed; background situation analyzing means for analyzing characteristics of the voice signal before the removal of the unnecessary component or a background noise; varying means for varying characteristics of the noise which is generated by the noise generating means in accordance with analysis results by the background situation analyzing means and the signal level analyzing means and for forming a comfort noise; and synthesizing means for multiplexing the comfort noise formed by the varying means to the voice signal after the removal of the unnecessary component.

With the above construction, the apparatus operates as a whole in a manner almost similar to a combination of the first and second aspects. That is, the signal power of the voice signal is measured by the signal level analyzing means and the characteristics of the voice signal or the background noise is analyzed by the background situation analyzing means. The characteristics of the noise are varied by the varying means on the basis of the analysis results, thereby forming the comfort noise.

According to the fourth aspect of the invention, in the comfort noise generating apparatus of the second or third aspect of the invention, the background situation analyzing means has a signal frequency characteristics analyzing part for analyzing frequency characteristics of the voice signal before the removal of the unnecessary component and for forming control information to control the varying means.

With the above construction, the signal frequency characteristics analyzing means analyzes the frequency characteristics of the voice signal before the removal of the unnecessary component and forms the control information to control the varying means. By controlling the varying means and varying the characteristics of the noise on the basis of the control information, the comfort noise is formed.

According to the fifth aspect of the invention, in the comfort noise generating apparatus of the second or third aspect of the invention, the background situation analyzing means has an LPC analyzing part for LPC analyzing the voice signal before the removal of the unnecessary component and for forming control information to control the varying means.

With the above construction, the LPC analyzing part LPC analyzes the voice signal before the removal of the unnecessary component and forms the control information to control the varying means. By controlling the varying means and varying the characteristics of the noise on the basis of the control information, the comfort noise is formed.

According to the sixth aspect of the invention, in the comfort noise generating apparatus of the second or third aspect of the invention, the background situation analyzing means comprises: a control information storing part for storing control information for allowing the varying means to form a comfort noise corresponding to a background noise in a vehicle which changes in accordance with a change in vehicle situation of an engine rotational speed, a speed, or a flow rate of an air-conditioner which has previously been measured, or engine control information, or the like; and a control information selecting part for selecting an optimum one of a plurality of control information stored in the control information storing part on the basis of the change in the vehicle situation.

With the above construction, on the basis of the change in vehicle situation such as an engine rotational speed or the like, the control information selecting part selects an optimum one of a plurality of control information stored in the control information storing part. By controlling the varying means and varying the characteristics of the noise on the basis of the selected control information, the comfort noise is formed.

According to the seventh aspect of the invention, in the comfort noise generating apparatus of any one of the first to sixth aspects of the invention, the noise generating means comprises: a noise generator for generating a white noise signal at a predetermined level; and a multiplier for multiplying the white noise signal from the noise generator by a gain calculated by the signal level analyzing part, thereby forming the white noise signal according to a level of the voice signal.

With the above construction, the noise generator always generates the white noise signal at the predetermined level. In the signal level analyzing part, the gain is calculated on the basis of the voice signal. In the multiplier, the gain is multiplied to the white noise signal from the noise generator, so that the white noise signal according to the level of the voice signal is formed.

DETAILED DESCRIPTION OF THE PREFERRED EMBODIMENTS

Embodiments of a comfort noise generating apparatus according to the invention will now be described hereinafter with reference to the drawings.

Figure 1:
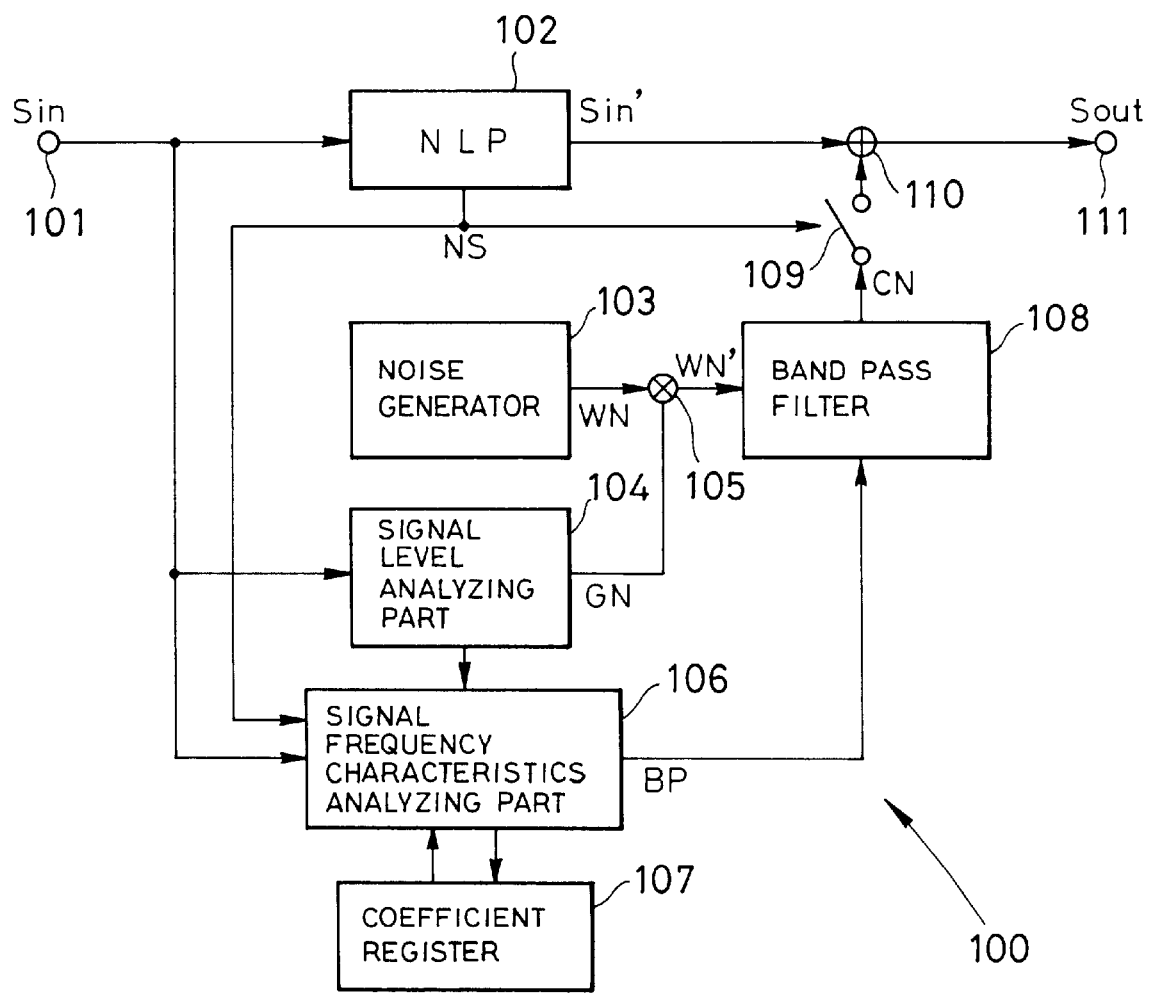
FIG. 1 is a functional block diagram showing the first embodiment of a comfort noise generating apparatus according to the invention.

FIG. 1 shows the first embodiment of the invention. A comfort noise generating apparatus 100 of the embodiment is an apparatus for forming a comfort noise according to frequency characteristics of a voice signal Sin before a non-linear process is performed by an NLP (non-linear processor) 102 and for adding the comfort noise to a voice signal Sin' after the non-linear process has been performed by the NLP 102. For this purpose, the comfort noise generating apparatus 100 is provided in parallel with the NLP 102.

The NLP 102 receives the voice signal Sin which is supplied to an input terminal 101 in sampling parts, executes the non-linear process in accordance with a level of this signal, removes unnecessary components, and generates the voice signal Sin'. The NLP further generates a signal NS indicative of the operating state of the non-linear process, and supplies it to a signal frequency characteristics analyzing part 106 and a switch 109, which will be explained later, and their operations are controlled by the signal NS.

The comfort noise generating apparatus 100 comprises: a noise generator 103; a signal level analyzing part 104; a multiplier 105; the signal frequency characteristics analyzing part 106; a coefficient register 107; a band pass filter 108; the switch 109; and an adder 110.

The noise generator 103 is noise generating means for generating a white noise signal WN at a preset level. The white noise signal WN generated by the noise generator 103 is transmitted to the multiplier 105.

The signal level analyzing part 104 is an apparatus for analyzing the signal level of the voice signal Sin before it is processed by the NLP 102. The signal level analyzing part 104 measures a signal power of the voice signal Sin by analyzing it, calculates a gain GN according to the level, and generates the gain to the multiplier 105. The signal level analyzing part 104 further generates the signal power information to the signal frequency characteristics analyzing part 106.

The multiplier 105 multiplies the white noise signal WN from the noise generator 103 by the gain GN as an analysis result from the signal level analyzing part 104, thereby varying the noise characteristics and forming a white noise signal WN' at the level according to the voice signal Sin from the input terminal 101 and transmitting the signal WN' to the band pass filter 108.

The signal frequency characteristics analyzing part 106 analyzes frequency characteristics of the voice signal Sin by an FFT or the like. The operation of the signal frequency characteristics analyzing part 106 is controlled by the operating state signal NS of the non-linear process from the NLP 102. That is, when the non-linear process is not performed in the NLP 102, the signal frequency characteristics analyzing part 106 analyzes the frequency characteristics of the voice signal Sin, calculates a band pass filter coefficient that is the nearest to frequency characteristics of the background noise of the voice signal Sin, and stores into the coefficient register 107. When the non-linear process is executed in the NLP 102, the signal frequency characteristics analyzing part 106 reads out the coefficient stored in the coefficient register 107 and transfers as a filter coefficient BP to the band pass filter 108. In this instance, the band pass filter coefficient stored in the coefficient register 107 is held until a new frequency characteristics analysis is executed by the signal frequency characteristics analyzing part 106. There is also a case where a plurality of band pass filter coefficients are stored into the coefficient register 107 in dependence on a construction of the band pass filter 108. Background situation analyzing means for analyzing the characteristics of the voice signal before the removal of the unnecessary component is constructed by the signal frequency characteristics analyzing part 106 and coefficient register 107.

The band pass filter 108 constructs a band pass filter by the filter coefficient BP from the signal frequency characteristics analyzing part 106. The band pass filter constructed by the filter coefficient BP from the signal frequency characteristics analyzing part 106 performs a band pass process to the white noise signal WN' from the multiplier 105, forms a signal CN as a background noise, and supplies the signal CN to the switch 109. The multiplier 105 and band pass filter 108 construct varying means for varying the characteristics of the noise which is generated by the noise generator 103 in accordance with an analysis result and for forming the comfort noise.

The switch 109 is opened or closed in accordance with the operating state signal NS of the non-linear process from the NLP 102. That is, when the non-linear process is performed in the NLP 102, the switch 109 is turned on and the signal CN from the band pass filter 108 is sent to the adder 110. When the non-linear process is not executed, the switch 109 is turned off and a "0" signal is generated as a signal CN.

The adder 110 is synthesizing means for multiplexing the formed comfort noise to the voice signal Sin after the removal of the unnecessary component. When the switch 109 is ON, the adder 110 adds the signal CN which is supplied from the band pass filter 108 to the voice signal Sin' processed by the NLP 102 and forms an output signal Sout and transmits to an output terminal 111.

The comfort noise generating apparatus 100 constructed as mentioned above operates as follows.

The voice signal Sin is sent to the input terminal 101 in sample units. The NLP 102 receives the voice signal Sin from the input terminal 101, executes the non-linear process according to the level of the signal, and generates the signal Sin'.

The voice signal Sin from the input terminal 101 is also supplied to the signal level analyzing part 104 and signal frequency characteristics analyzing part 106.

The signal level analyzing part 104 measures a signal power of the voice signal Sin, calculates the gain GN according to the signal power, transfers the gain to the multiplier 105, and sends the signal power information as one of analysis data to the signal frequency characteristics analyzing part 106. The noise generator 103 always generates the white noise signal WN at the predetermined level to the multiplier 105. The multiplier 105 multiplies the white noise signal WN from the noise generator 103 by the gain GN from the signal level analyzing part 104, forms the white noise signal WN' at the level according to the voice signal Sin, and transmits the signal WN' to the band pass filter 108.

The signal frequency characteristics analyzing part 106 executes or stops the analyzing process by the control using the NS signal. That is, when the non-linear process is not performed in the NLP 102, the signal frequency characteristics analyzing part 106 operates, calculates a band pass filter coefficient that is the nearest to the frequency characteristics of the background noise of the voice signal Sin, and stores it into the coefficient register 107. When the non-linear process is performed in the NLP 102, the signal frequency characteristics analyzing part 106 reads out the coefficient stored in the coefficient register 107 and transmits it as a filter coefficient BP to the band pass filter 108.

In the band pass filter 108, a band pass filter is constructed by the filter coefficient BP from the signal frequency characteristics analyzing part 106, a band pass process is performed to the white noise signal WN' from the multiplier 105, and the signal CN as a comfort noise is formed.

The switch 109 is set to be in an ON state, at the time when the signal frequency characteristics analyzing part 106 is made operative, by the NS signal, to output the filter coefficient BP. The signal CN from the band pass filter 108, therefore, is supplied to the adder 110 through the switch 109.

The adder 110 adds the signal CN from the band pass filter 108 to the signal Sin' from the NLP 102, thereby forming an output signal Sout and sending it to the output terminal 111.

As described above, since the comfort noise is formed on the basis of the signal level of the voice signal Sin before the execution of the process in the NLP 102 and the frequency characteristics and is added to the voice signal Sin' after completion of the process, the fracture feeling and feeling of wrongness of the voice sound can be improved at the timings before and after the process in the NLP 102.

In the embodiment, although the comfort noise generating apparatus 100 has been provided in parallel with the NLP 102, the comfort noise generating apparatus 100 of the invention is not limited to such a construction. The invention can be also applied to another system which operates like an NLP, for example, an echo canceler, a noise canceler, or the like having another structure, so that an operation and an effect which are similar to those mentioned above can be performed.

Figure 2:
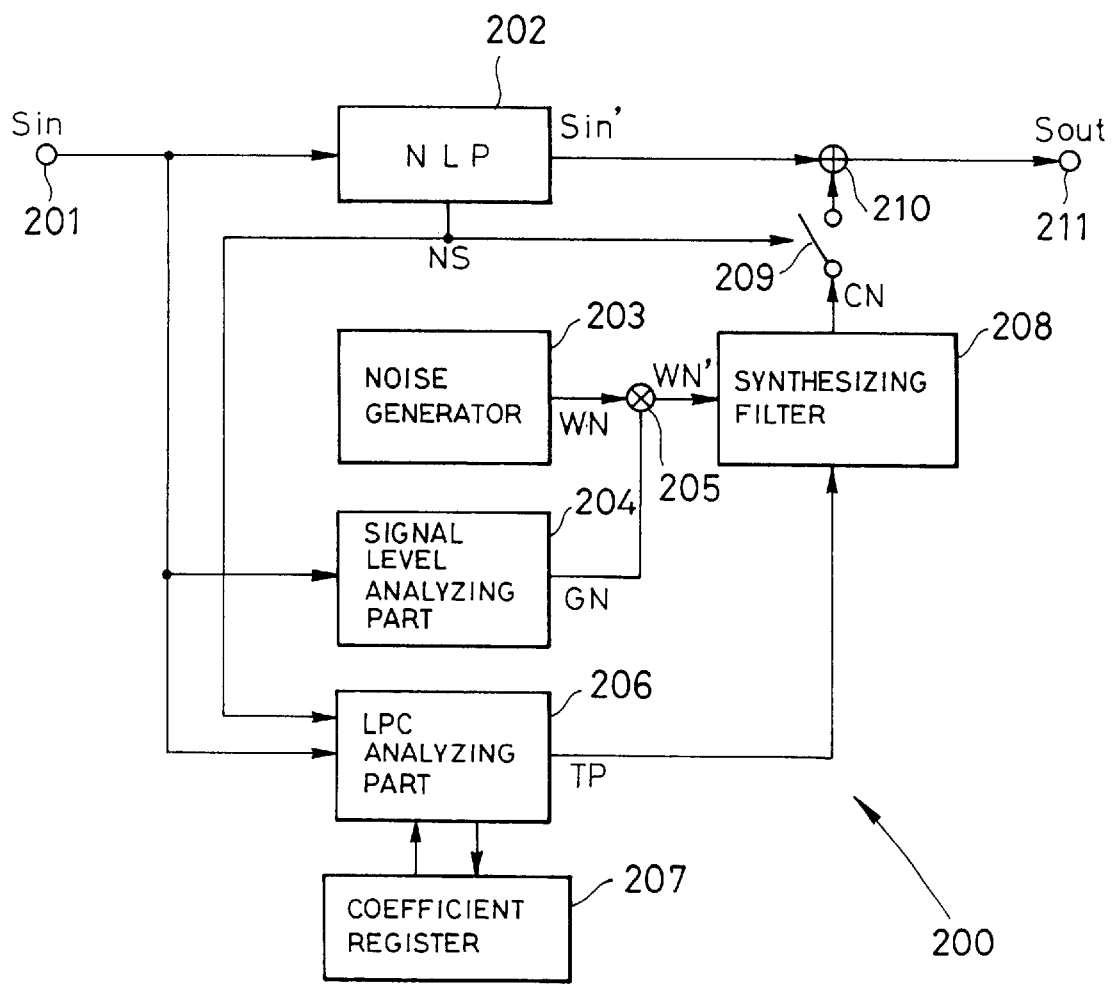
FIG. 2 is a functional block diagram showing the second embodiment of a comfort noise generating apparatus according to the invention.

FIG. 2 shows the second embodiment of the invention.

A whole construction of a comfort noise generating apparatus 200 of the embodiment is almost similar to that of the comfort noise generating apparatus 100 of the first embodiment. The same component elements, therefore, are designated by the same denominations (reference numerals are different) and their descriptions are omitted here.

In the comfort noise generating apparatus 200, an LPC analyzing part 206 and a coefficient register 207 are used as background situation analyzing means. The LPC analyzing part 206 LPC analyzes the voice signal Sin, calculates a tap coefficient, and stores into the coefficient register 207. When a non-linear process is executed in an NLP 202, the LPC analyzing part 206 generates the coefficient stored in the coefficient register 207 as a tap coefficient TP to a synthesizing filter 208.

In the synthesizing filter 208, a synthesizing filter is constructed by the tap coefficient TP which is generated from the LPC analyzing part 206. The synthesizing filter 208 generates the signal CN by using the white noise signal WN' from a multiplier 205 as an excitation source.

The other construction and operation are similar to those in the first embodiment.

In the comfort noise generating apparatus 200 with the above construction, by using the LPC analyzing part 206 and coefficient register 207 as background situation analyzing means, the tones of the background noise before and after the execution of the NLP operation are matched and an unnaturalness such as a fracture feeling of the voice sound or the like can be improved.

The invention according to the embodiment can be also applied to another system which operates like an NLP, for instance, an echo canceler, a noise canceler, or the like having another structure in a manner similar to the first embodiment.

Figure 3:
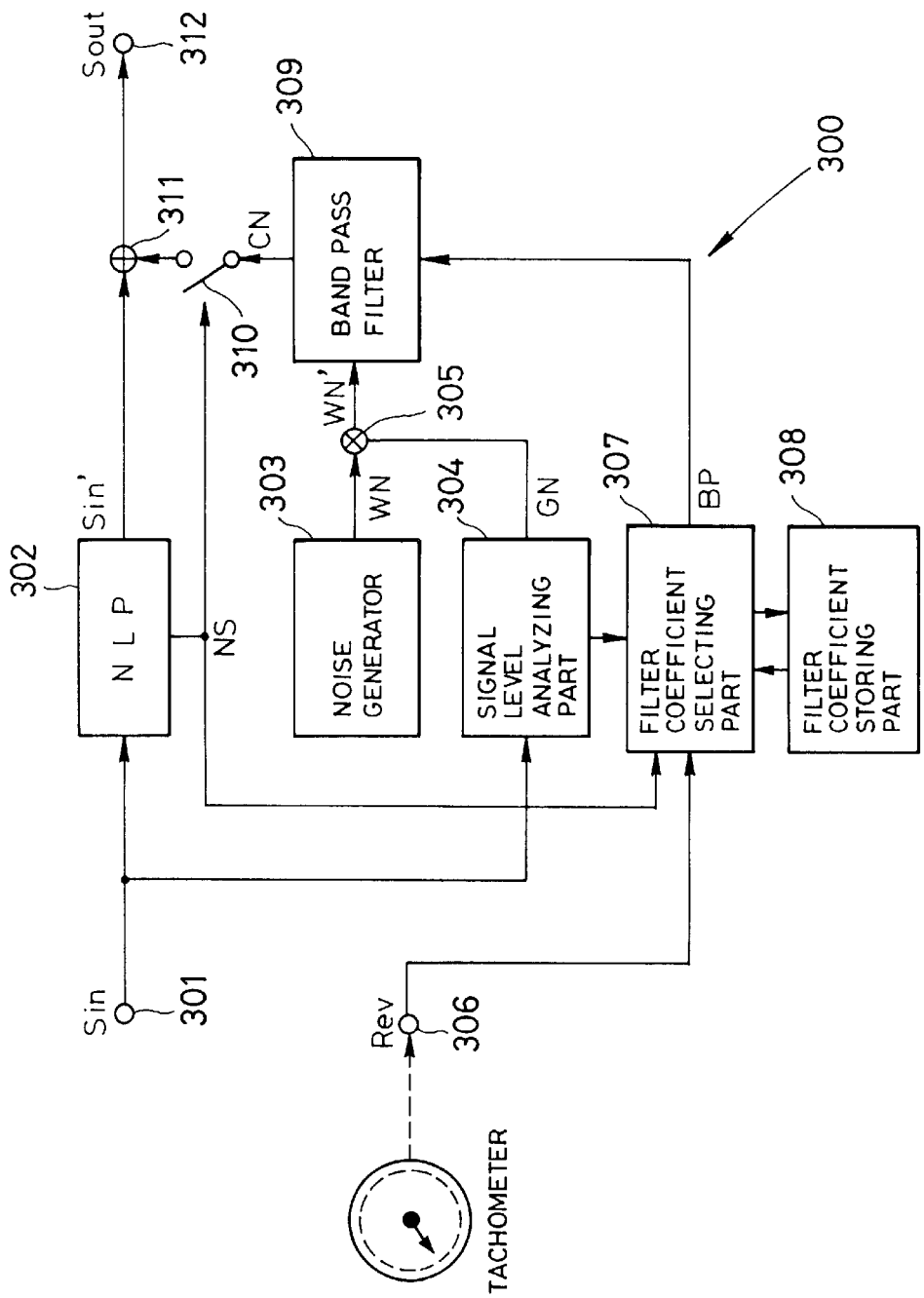
FIG. 3 is a functional block diagram showing the third embodiment of a comfort noise generating apparatus according to the invention.

FIG. 3 shows the third embodiment of the invention.

A whole construction of a comfort noise generating apparatus 300 of the embodiment is almost similar to that of the comfort noise generating apparatus 100 of the first embodiment. The same component elements, therefore, are designated by the same denominations (reference numerals are different) and their descriptions are omitted here. The embodiment is formed by assuming an echo canceler or the like which is used in a car kit mounted in a vehicle.

In the comfort noise generating apparatus 300 of the embodiment, rotational speed information Rev of an engine of a vehicle is used as a background situation to be analyzed. The rotational speed information Rev of the engine is obtained from a tachometer of the vehicle, an engine control computer, or the like and is supplied from an input terminal 306.

The background situation analyzing means is constructed by a filter coefficient selecting part 307 and a filter coefficient storing part 308.

The filter coefficient selecting part 307 receives the rotational speed information Rev of the engine which is fetched from the input terminal 306 and signal power information which is received from a signal level analyzing part 304, selects an optimum band pass filter coefficient from the filter coefficient storing part 308, and transmits as a filter coefficient BP to a band pass filter 309. The operation of the filter coefficient selecting part 307 is controlled by the operating state signal NS of the non-linear process from an NLP 302 in a manner similar to the first embodiment.

A plurality of band pass filter coefficients are stored in the filter coefficient storing part 308. A plurality of band pass filter coefficients are coefficients which have been preset in consideration of the relations among an actual engine rotational speed, a noise level, and the signal power of the voice signal Sin and are stored in the filter coefficient storing part 308 in an interlocking relation with the engine rotational speed and the signal power of the voice signal Sin.

The filter coefficient selecting part 307, therefore, selects the optimum band pass filter coefficient from the filter coefficient storing part 308 on the basis of the rotational speed information Rev of the engine or the like as mentioned above and sends it to the band pass filter 309.

This is because in the case where the noise of the engine during the operation is dominant in the background noise in the vehicle, the background noise shows frequency characteristics regarding the rotational speed of the engine.

In the comfort noise generating apparatus 300 constructed as mentioned above, the engine rotational speed is fetched as background situation analysis information and the apparatus operates in a manner similar to the apparatus of the first embodiment.

By using the information of the engine rotational speed as a background situation to be analyzed as mentioned above, the optimum filter coefficient BP can be selected. By performing a band pass process to the white noise from a noise generator 303 and adding the resultant white noise to the voice signal Sin' after the process, the tones of the background noise before and after the execution of the NLP operation are matched and the fracture feeling of the voice sound can be improved.

By presetting the filter coefficient, an amount of calculation can be reduced.

The comfort noise generating apparatus 300 is not limited to the echo canceler so long as it is a car kit which is mounted in the vehicle and can be also applied to another system which operates like an NLP, for instance, an echo canceler, a noise canceler, or the like having another structure.

Figure 4:
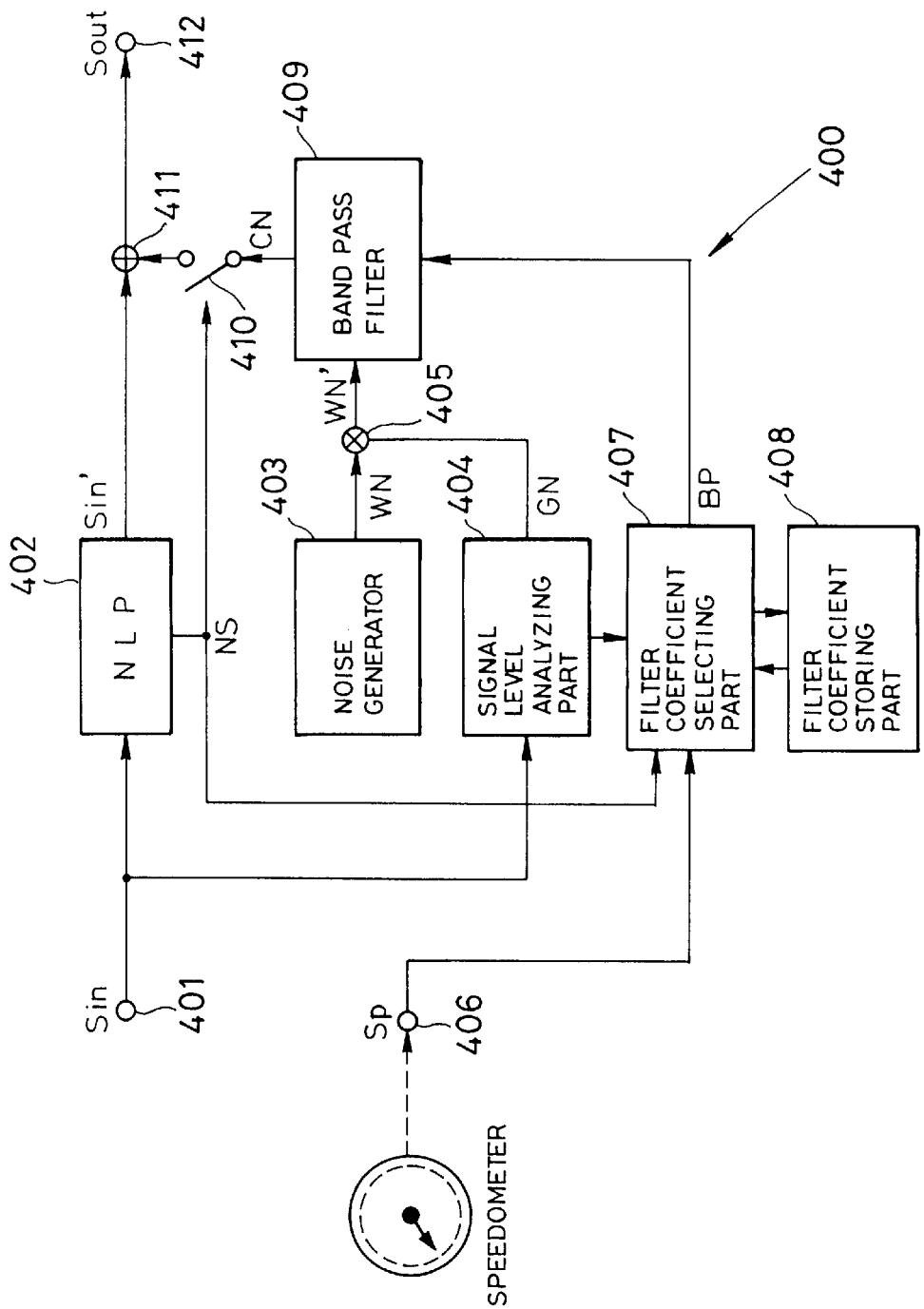
FIG. 4 is a functional block diagram showing the fourth embodiment of a comfort noise generating apparatus according to the invention.

FIG. 4 shows the fourth embodiment of the invention.

A whole construction of the comfort noise generating apparatus 400 of the embodiment is almost similar to that of the comfort noise generating apparatus 300 of the third embodiment. The same component elements, therefore, are designated by the same denominations (reference numerals are different) and their descriptions are omitted here.

In a comfort noise generating apparatus 400 of the embodiment, speed information Sp of a vehicle is used as a background situation to be analyzed. The speed information Sp is obtained from a speedometer of the vehicle, an engine control computer, or the like and is received from an input terminal 406.

The background situation analyzing means is constructed by a filter coefficient selecting part 407 and a filter coefficient storing part 408.

The filter coefficient selecting part 407 receives speed information Sp which is supplied from the input terminal 406 and signal power information which is supplied from a signal level analyzing part 404, selects an optimum band pass filter coefficient from the filter coefficient storing part 408, and transmits it as a filter coefficient BP to a band pass filter 409. The operation of the filter coefficient selecting part 407 is controlled based on an operating state signal NS of the non-linear process from an NLP 402 in a manner similar to the first embodiment.

A plurality of band pass filter coefficients are stored in the filter coefficient storing part 408. Those plurality of band pass filter coefficients are coefficients which have been preset in consideration of the relations among the actual speed of the vehicle, noise level, and signal power of the voice signal Sin and are stored in the filter coefficient storing part 408 in an interlocking relation with the speed of the vehicle and the signal power of the voice signal Sin.

The filter coefficient selecting part 407, therefore, selects the optimum band pass filter coefficient from the filter coefficient storing part 408 on the basis of the vehicle speed information Sp or the like as mentioned above and sends it to the band pass filter 409.

This is because in the case where a road noise, an air-cut sound, or the like due to an increase in vehicle speed is dominant in the background noise in the vehicle, the background noise shows frequency characteristics regarding the vehicle speed.

In the comfort noise generating apparatus 400 constructed as mentioned above, the speed of the vehicle is fetched as background situation analysis information and apparatus operates in a manner similar to the apparatus of the first embodiment.

By using the speed information of the vehicle as a background situation to be analyzed as mentioned above, the optimum filter coefficient BP can be selected. The tones of the background noise before and after the execution of the NLP operation are matched, consequently, and the fracture feeling of the voice sound can be improved in a manner similar to the first embodiment.

By presetting the filter coefficient, an amount of calculation can be reduced.

The comfort noise generating apparatus 400 is not limited to the echo canceler and can be also applied to another system which operates like an NLP, for instance, an echo canceler, a noise canceler, or the like having another structure.

Figure 5:
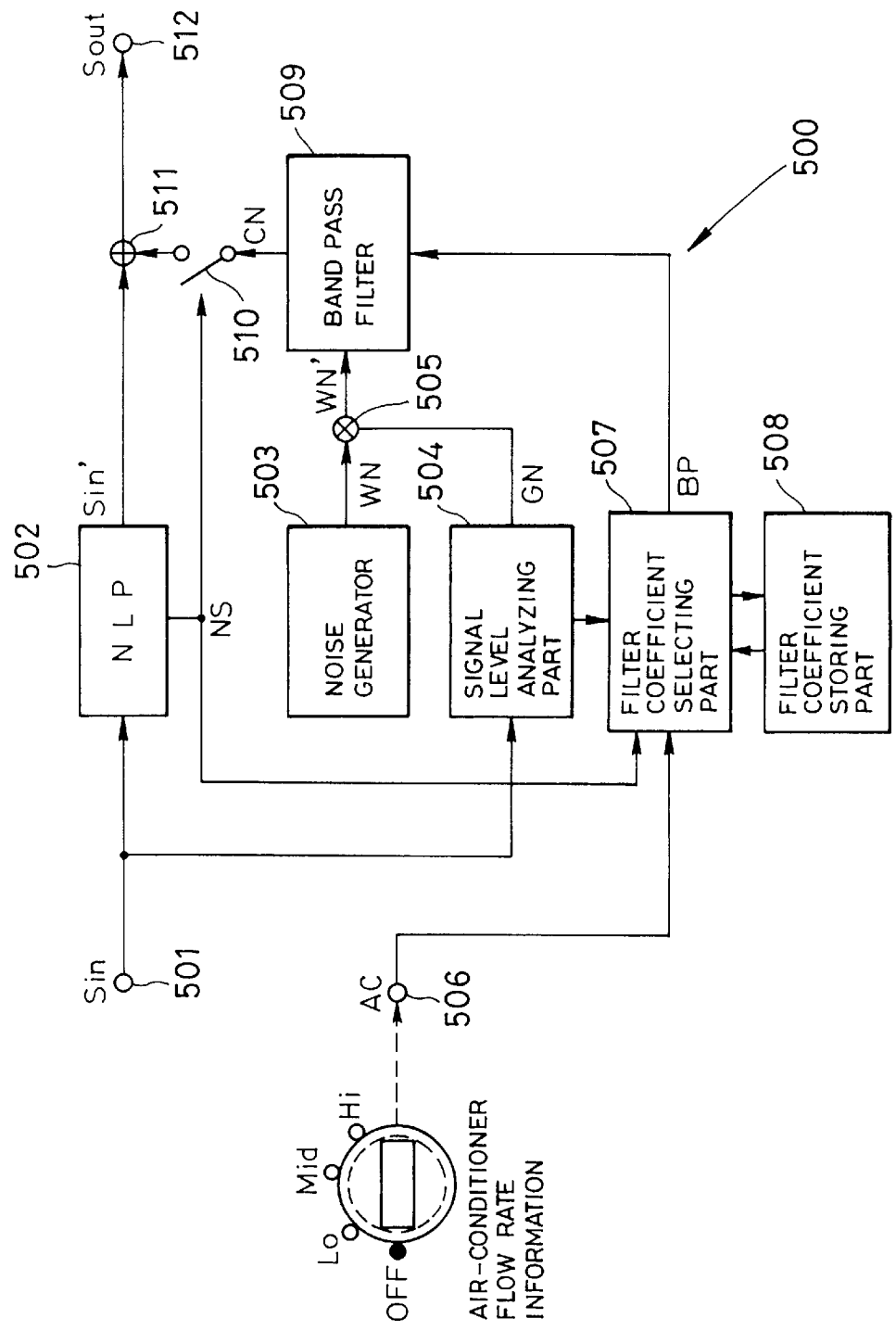
FIG. 5 is a functional block diagram showing the fifth embodiment of a comfort noise generating apparatus according to the invention.

FIG. 5 shows the fifth embodiment of the invention.

The embodiment is also formed by assuming an echo canceler or the like which is used in a car kit mounted in a vehicle in a manner similar to the third and fourth embodiments. Since a whole construction is almost similar to that of the third embodiment, only the different portions will be explained.

In a comfort noise generating apparatus 500 of the embodiment, flow rate control information AC of an air-conditioner of the vehicle is used as a background situation to be analyzed. The flow rate control information AC of the air-conditioner of the vehicle is obtained from a control computer of the air-conditioner of the vehicle and is received from an input terminal 506.

The background situation analyzing means is constructed by a filter coefficient selecting part 507 and a filter coefficient storing part 508.

The filter coefficient selecting part 507 receives the flow rate control information AC of the air-conditioner which is supplied from the input terminal 506 and signal power information which is supplied from a signal level analyzing part 504, selects an optimum band pass filter coefficient from the filter coefficient storing part 508, and transmits it as a filter coefficient BP to a band pass filter 509. The operation of the filter coefficient selecting part 507 is controlled based on an operating state signal NS of the non-linear process from an NLP 502 in a manner similar to the first embodiment.

A plurality of band pass filter coefficients are stored in the filter coefficient storing part 508. Those plurality of band pass filter coefficients are coefficients which have been preset in consideration of the relations among the actual flow rate of the air-conditioner, noise level, and signal power of the voice signal Sin and are stored in the filter coefficient storing part 508 in an interlocking relation with the flow rate of the air-conditioner and the signal power of the voice signal Sin.

The filter coefficient selecting part 507, therefore, selects the optimum band pass filter coefficient from the filter coefficient storing part 508 on the basis of the air-conditioner flow rate information or the like as mentioned above and sends it to the band pass filter 509.

This is because in the case where a noise due to the blow-out of the air-conditioner of the vehicle is dominant in the background noise in the vehicle (in case of a car type such that sound insulating performance of the vehicle is high and the noise due to the blow-out of the air-conditioner is relatively large or the like), the background noise shows frequency characteristics regarding the air-conditioner flow rate.

In the comfort noise generating apparatus 500 constructed as mentioned above, the flow rate of the air-conditioner is fetched as background situation analysis information and the apparatus operates in a manner similar to the apparatus of the first embodiment.

By using the flow rate information of the air-conditioner as a background situation to be analyzed as mentioned above, the optimum filter coefficient BP can be selected. The tones of the background noise before and after the execution of the NLP operation are matched, consequently, and the fracture feeling of the voice sound can be improved in a manner similar to the first embodiment.

By presetting the filter coefficient, an amount of calculation can be reduced.

The comfort noise generating apparatus 500 is not limited to the on-vehicle apparatus but can be also applied to a hands-free horn system, a noise canceler, or the like which is used indoors so long as there is means for obtaining the flow rate information of the air-conditioner.

Figure 6:
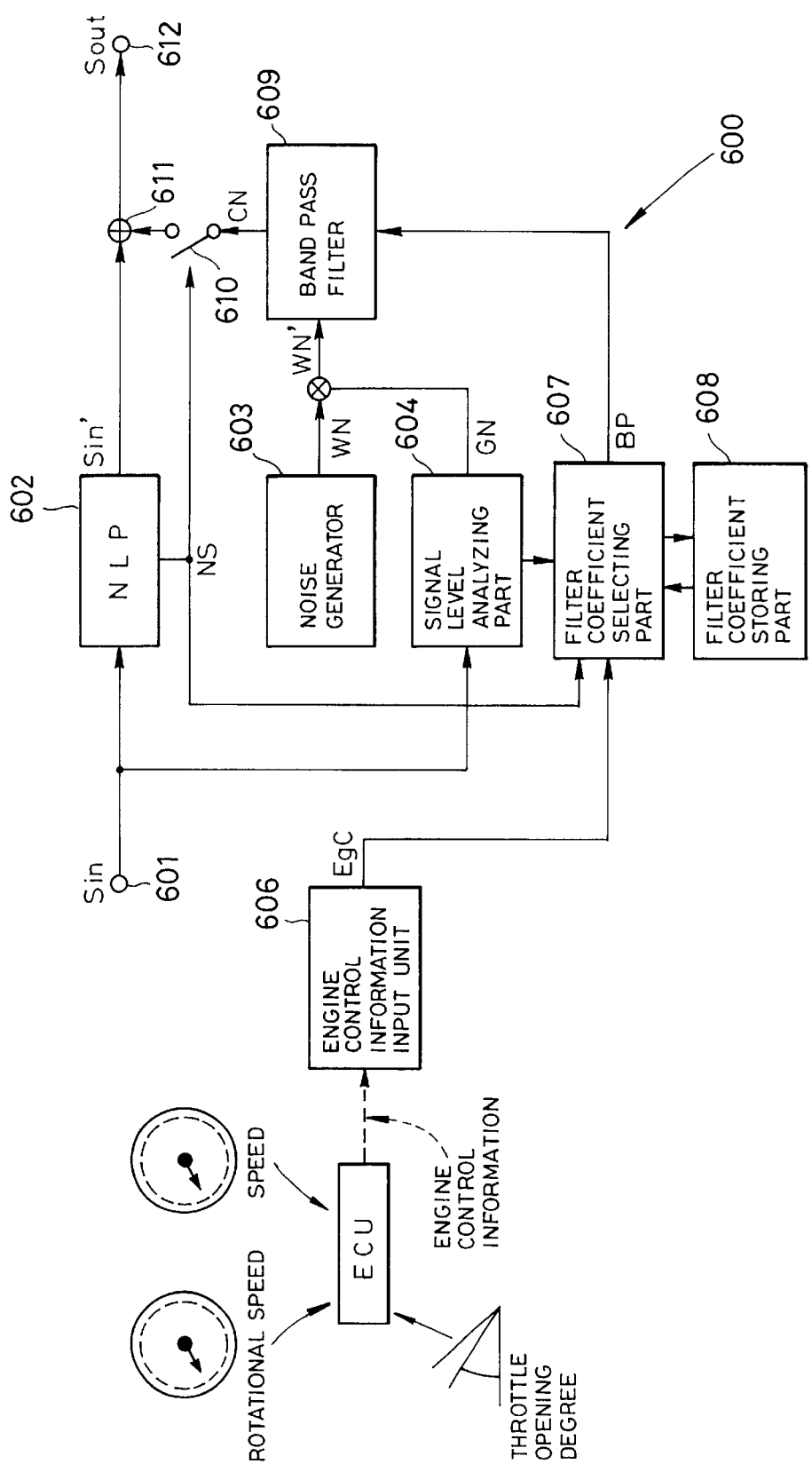
FIG. 6 is a functional block diagram showing the sixth embodiment of a comfort noise generating apparatus according to the invention.

FIG. 6 shows the sixth embodiment of the invention.

The embodiment is also formed by assuming an echo canceler or the like which is used in a car kit mounted in a vehicle in a manner similar to the third, fourth, and fifth embodiments. Since a whole construction is almost similar to that of the third embodiment, only the different portions will be explained.

In a comfort noise generating apparatus 600 of the embodiment, engine control information EgC is used as a background situation to be analyzed. The engine control information EgC is information for fetching various information and integrating them and controlling the engine. Specifically speaking, various control information is supplied from an engine control computer (ECU) or the like of the vehicle to an engine control information input part 606 and the engine control information EgC obtained by integrating those information is generated. The various control information which is supplied in this instance is information for engine control such as opening degree of an acceleration pedal, engine rotational speed, fuel injection amount, and the like. The engine control information EgC is sent to a filter coefficient selecting part 607.

The background situation analyzing means is constructed by the filter coefficient selecting part 607 and a filter coefficient storing part 608.

The filter coefficient selecting part 607 receives the engine control information EgC which is supplied from the engine control information input part 606 and signal power information which is supplied from a signal level analyzing part 604, selects an optimum band pass filter coefficient from the filter coefficient storing part 608, and transmits it as a filter coefficient BP to a band pass filter 609. The operation of the filter coefficient selecting part 607 is controlled based on an operating state signal NS of the non-linear process from an NLP 602 in a manner similar to the first embodiment.

A plurality of band pass filter coefficients are stored in the filter coefficient storing part 608. Those plurality of band pass filter coefficients are coefficients which have been preset in consideration of the relations among the engine control information EgC, noise level, and signal power of the voice signal Sin and are stored in the filter coefficient storing part 608 in an interlocking relation with the engine control information EgC and the signal power of the voice signal Sin.

The filter coefficient selecting part 607, therefore, selects the optimum band pass filter coefficient from the filter coefficient storing part 608 based on the engine control information EgC or the like as mentioned above and sends it to the band pass filter 609.

This is because in the case where an engine noise of the vehicle is dominant in the background noise in the vehicle and it depends on an operating state (ON/OFF of the acceleration pedal, output state) of the engine (in case of a car type having characteristics in the engine noise or the like), the background noise shows frequency characteristics regarding the engine control information.

In the comfort noise generating apparatus 600 constituted as mentioned above, the engine control information EgC is fetched as background situation analysis information and the apparatus operates in a manner similar to the apparatus of the first embodiment.

By using the engine control information EgC as a background situation to be analyzed as mentioned above, the optimum filter coefficient BP can be selected. The tones of the background noise before and after the execution of the NLP operation are matched, consequently, and the feeling fracture associated with the voice sound can be reduced in a manner similar to the first embodiment.

By presetting the filter coefficient, an amount of calculation can be reduced.

The comfort noise generating apparatus 600 is not limited to the echo canceler but can be also applied to another system which operates like an NLP, for example, a noise canceler or the like so long as it is an on-vehicle car kit.

As described in detail above, according to the comfort noise generating apparatus of the invention, the following advantages can be derived.

Since the comfort noise is formed on the basis of the background situation or the like of the voice signal before the unnecessary component due to the NLP or the like is removed and is added to the voice signal after the removal of the unnecessary component, the feeling fracture associated with the voice sound and the feeling of unsuitableness can be reduced at timings before and after the process of the voice signal.

What is claimed is:

1. A comfort noise generating apparatus for generating a comfort noise according to a voice signal from which an unnecessary component has been removed and for adding said comfort noise to said voice signal, comprising:

noise generating means for generating a noise to be multiplexed to the voice signal after said unnecessary component has been removed;

signal level analyzing means for measuring a signal power of the voice signal before said unnecessary component is removed;

varying means for varying characteristics of the noise which is generated by said noise generating means in accordance with an analysis result by said signal level analyzing means and for forming a comfort noise; and synthesizing means for multiplexing the comfort noise formed by said varying means to the voice signal after the removal of said unnecessary component.

2. An apparatus according to claim 1, wherein said noise generating means comprises:

a noise generator for generating a white noise signal at a predetermined level; and a multiplier for multiplying the white noise signal from said noise generator by a gain calculated by said signal level analyzing part, thereby forming the white noise signal according to a level of said voice signal.

3. A comfort noise generating apparatus for generating a comfort noise according to a voice signal from which an unnecessary component has been removed and for adding said comfort noise to said voice signal, comprising:

noise generating means for generating a noise to be multiplexed to the voice signal after said unnecessary component has been removed;

background situation analyzing means for analyzing characteristics of the voice signal before said unnecessary component is removed or a background noise;

varying means for varying characteristics of the noise which is generated by said noise generating means in accordance with an analysis result by said background situation analyzing means and for forming a comfort noise; and synthesizing means for multiplexing the comfort noise formed by said varying means to the voice signal after the removal of said unnecessary component.

4. An apparatus according to claim 2, wherein said background situation analyzing means has a signal frequency characteristics analyzing part for analyzing the frequency characteristics of the voice signal before the removal of said unnecessary component and for forming control information to control said varying means.

5. An apparatus according to claim 4, wherein said noise generating means comprises:

a noise generator for generating a white noise signal at a predetermined level; and a multiplier for multiplying the white noise signal from said noise generator by a gain calculated by said signal level analyzing part, thereby forming the white noise signal according to a level of said voice signal.

6. An apparatus according to claim 3, wherein said background situation analyzing means has an LPC analyzing part for LPC analyzing the voice signal before the removal of said unnecessary component and for forming control information to control said varying means.

7. An apparatus according to claim 6, wherein said noise generating means comprises:

a noise generator for generating a white noise signal at a predetermined level; and a multiplier for multiplying the white noise signal from said noise generator by a gain calculated by said signal level analyzing part, thereby forming the white noise signal according to a level of said voice signal.

8. An apparatus according to claim 3, wherein said background situation analyzing means comprises:

a control information storing part for storing control information for allowing said varying means to form a comfort noise corresponding to the background noise in a vehicle which changes in accordance with a change in vehicle situation of an engine rotational speed, a speed, or a flow rate of an air-conditioner which has previously been measured, or engine control information, or the like; and a control information selecting part for selecting an optimum one of a plurality of control information stored in said control information storing part on the basis of the change in said vehicle situation.

9. An apparatus according to claim 8, wherein said noise generating means comprises:

a noise generator for generating a white noise signal at a predetermined level; and a multiplier for multiplying the white noise signal from said noise generator by a gain calculated by said signal level analyzing part, thereby forming the white noise signal according to a level of said voice signal.

10. An apparatus according to claim 3, wherein said noise generating means comprises:

a noise generator for generating a white noise signal at a predetermined level; and a multiplier for multiplying the white noise signal from said noise generator by a gain calculated by said signal level analyzing part, thereby forming the white noise signal according to a level of said voice signal.

11. A comfort noise generating apparatus for generating a comfort noise according to a voice signal from which an unnecessary component has been removed and for adding said comfort noise to said voice signal, comprising:

noise generating means for generating a noise to be multiplexed to the voice signal after said unnecessary component has been removed;

signal level analyzing means for measuring a signal power of the voice signal before said unnecessary component is removed;

background situation analyzing means for analyzing characteristics of the voice signal before the removal of said unnecessary component or a background noise;

varying means for varying characteristics of the noise which is generated by said noise generating means in accordance with analysis results by said background situation analyzing means and said signal level analyzing means and for forming a comfort noise; and synthesizing means for multiplexing the comfort noise formed by the varying means to the voice signal after the removal of said unnecessary component.

12. An apparatus according to claim 11, wherein said background situation analyzing means has a signal frequency characteristics analyzing part for analyzing the frequency characteristics of the voice signal before the removal of said unnecessary component and for forming control information to control said varying means.

13. An apparatus according to claim 12, wherein said noise generating means comprises:

a noise generator for generating a white noise signal at a predetermined level; and a multiplier for multiplying the white noise signal from said noise generator by a gain calculated by said signal level analyzing part, thereby forming the white noise signal according to a level of said voice signal.

14. An apparatus according to claim 11, wherein said background situation analyzing means has an LPC analyzing part for LPC analyzing the voice signal before the removal of said unnecessary component and for forming control information to control said varying means.

15. An apparatus according to claim 14, wherein said noise generating means comprises:

a noise generator for generating a white noise signal at a predetermined level; and a multiplier for multiplying the white noise signal from said noise generator by a gain calculated by said signal level analyzing part, thereby forming the white noise signal according to a level of said voice signal.

16. An apparatus according to claim 11, wherein said background situation analyzing means comprises:

a control information storing part for storing control information for allowing said varying means to form a comfort noise corresponding to the background noise in a vehicle which changes in accordance with a change in vehicle situation of an engine rotational speed, a speed, or a flow rate of an air-conditioner which has previously been measured, or engine control information, or the like; and a control information selecting part for selecting an optimum one of a plurality of control information stored in said control information storing part on the basis of the change in said vehicle situation.

17. An apparatus according to claim 16, wherein said noise generating means comprises:

a noise generator for generating a white noise signal at a predetermined level; and a multiplier for multiplying the white noise signal from said noise generator by a gain calculated by said signal level analyzing part, thereby forming the white noise signal according to a level of said voice signal.

18. An apparatus according to claim 11, wherein said noise generating means comprises:

a noise generator for generating a white noise signal at a predetermined level; and a multiplier for multiplying the white noise signal from said noise generator by a gain calculated by said signal level analyzing part, thereby forming the white noise signal according to a level of said voice signal.

* * * * *